(12) United States Patent
Park et al.

(10) Patent No.: US 8,133,835 B2
(45) Date of Patent: Mar. 13, 2012

(54) MOLECULAR WEIGHT CONTROLLABLE, HIGH 1,4-TRANS POLYBUTADIENE CATALYST SYSTEM

(75) Inventors: Hwieon Park, Daejeon (KR); Gwang Hoon Kwag, Daejeon (KR); Hoochae Kim, Daejeon (KR); Seung Hwon Lee, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 12/686,104

(22) Filed: Jan. 12, 2010

(65) Prior Publication Data

US 2010/0261847 A1    Oct. 14, 2010

(30) Foreign Application Priority Data

Apr. 9, 2009    (KR) .................. 10-2009-0030829

(51) Int. Cl.
*B01J 31/04* (2006.01)
*C08F 4/70* (2006.01)
*C08F 136/06* (2006.01)

(52) U.S. Cl. ........ 502/170; 502/103; 502/121; 502/125; 526/169.1; 526/335

(58) Field of Classification Search .................. 502/102, 502/121, 125, 103, 170; 526/169.1, 335
See application file for complete search history.

(56) References Cited

U.S. PATENT DOCUMENTS

| | | | |
|---|---|---|---|
| 5,025,059 A | 6/1991 | Mouri et al. | |
| 5,089,574 A | 2/1992 | Castner | |
| 5,109,082 A | 4/1992 | Matsuda et al. | |
| 5,448,002 A | 9/1995 | Castner | |
| 5,834,573 A | 11/1998 | Castner | |
| 6,018,007 A | 1/2000 | Lynch | |
| 6,310,152 B1 | 10/2001 | Castner | |
| 6,545,107 B2 | 4/2003 | Luo et al. | |
| 6,608,154 B2 | 8/2003 | Halasa et al. | |
| 6,617,406 B2 | 9/2003 | Castner | |

FOREIGN PATENT DOCUMENTS

| | | |
|---|---|---|
| EP | 1 770 128 A | 4/2007 |
| JP | 46-2833 | 1/1971 |

OTHER PUBLICATIONS

Natta, G et al.: "Thermodynamic Data on Transtatic Polybutadiene", *Stereospecific Polymers, Rubber and Plastics Age*, 44, 1963, pp. 42-43.

Makino, Kenya et al.: "Preparation of soluble [(TiCl$_4$+MgCl$_2$).phosphate] and soluble [TiCl$_3$-O-MgCl).phosphate] catalysts and their use for copolymerization of ethylene with propylene", *Polymer Bulletin*, 27, 1991, pp. 41-46.

*Primary Examiner* — Caixia Lu
(74) *Attorney, Agent, or Firm* — Frommer Lawrence & Haug LLP; Ronald R Santucci (57) ABSTRACT

Provided are a molecular weight controllable, high 1,4-trans polybutadiene catalyst system, and more particularly, a four-component catalyst for preparing 1,4-trans polybutadiene with high yield, the catalyst comprising a cobalt compound, an organoaluminum compound, a phenol-based compound, and a phosphorus-based compound used to prepare 1,4-trans polybutadiene by polymerizing butadiene or a butadiene derivative, and capable of controlling the molecular weight of 1,4-trans polybutadiene by regulating the amount of the phosphorus-based compound. In particular, 1,4-trans polybutadiene may be efficiently applied to tires, belts, or the like since it has excellent tensile strength, tear strength, and cut & chip properties with increasing processability.

17 Claims, 2 Drawing Sheets

MOLECULAR WEIGHT CONTROLLABLE, HIGH 1,4-TRANS POLYBUTADIENE CATALYST SYSTEM

CROSS-REFERENCE TO RELATED APPLICATION

This application claims under 35 U.S.C. §119(a) the benefit of Korean Patent Application No. 10-2009-0030829 filed Apr. 9, 2009, the entire contents of which are incorporated herein by reference.

BACKGROUND OF THE INVENTION

1. Field of the Invention

The present invention relates to a molecular weight controllable, high 1,4-trans polybutadiene catalyst system.

2. Description of the Related Art

Synthesis of 1,4-trans polybutadiene using a butadiene monomer has been reported [Rubber Plast. Age 1963, 44, 42]. 1,4-trans polybutadiene is synthesized by polymerizing a butadiene monomer using a Ziegler-Natta catalyst system including a vanadium compound and alkyl aluminum. However, since the melting point (Tm) of the 1,4-trans polybutadiene is higher than room temperature (70 to 130° C.), the 1,4-trans polybutadiene is required to be aged at high temperature. 1,4-trans polybutadiene may be synthesized using a variety of methods in addition to using the vanadium catalyst system.

Japanese Patent Application No. 1967-67187 discloses synthesis of polybutadiene having a trans content of 75 to 80% using a catalyst combination comprising a cobalt compound, organic aluminum, and phenol.

U.S. Pat. No. 5,089,574 discloses a process for synthesizing 1,4-trans-polybutadiene by polymerizing 1,3-butadiene monomer in the presence of a catalyst system which includes cobalt carboxylate, alkyl phenol, dialkyl sulfoxide, and an organoaluminum compound. In particular, the molecular weight of 1,4-trans polybutadiene is controlled by $CS_2$.

U.S. Pat. No. 5,448,002 discloses a process for synthesizing 1,4-trans-polybutadiene by polymerizing 1,3-butadiene monomer in the presence of a catalyst system which includes cobalt carboxylate, alkyl phenol, dialkyl sulfoxide, and an organoaluminum compound. In particular, the molecular weight of 1,4-trans polybutadiene is controlled using dialkyl sulfoxide.

U.S. Pat. Nos. 6,310,152 and 6,617,406 disclose processes for synthesizing 1,4-trans polybutadiene by polymerizing 1,3-butadiene monomer in the presence of a catalyst system which includes cobalt carboxylate, p-alkyl phenol or a mixture of p-alkyl phenol and o-alkyl phenol, and an organoaluminum compound.

U.S. Pat. No. 5,834,573 discloses a process for synthesizing 1,4-trans polybutadiene by polymerizing 1,3-butadiene monomer in the presence of a catalyst system which includes cobalt (III) acetylacetonate, alkyl phenol, and an organoaluminum compound.

U.S. Pat. Nos. 5,025,059 and 6,608,154 disclose processes for synthesizing trans polybutadiene in the presence of a catalyst system which includes barium thymolate, trialkyl aluminum, and alkyl lithium.

An example of phosphorus-based compounds used for obtaining rubber is described in a literature [Polymer Bulletin, Vol 27, p 41~46 (1991)]. Ethylene and propylene are copolymerized using ($TiCl_4$+$MgCl_2$)-phosphate catalyst and ($TiCl_3$+MgCl)-phosphate catalyst to obtain rubber with low crystallinity.

According to U.S. Pat. Nos. 6,545,107, 1,2-polybutadiene having vinyl groups and a yield ranging from 80 to 90% is synthesized using a catalyst including a molybdenum-containing compound, a silyl phosphonate compound, and an organoaluminum compound.

According to European Patent No. 1770128 A1, discoloration of 1,2-polybutadiene is compared by applying a phosphorus-based compound, a phenol-based compound, and a sulfur-containing ether compound, in the preparation of 1,2-polybutadiene using a cobalt catalyst. U.S. Pat. No. 5,109,082 discloses a process for producing 1,4-cis polybutadiene using a catalyst system including cobalt octoate and diethylaluminum chloride in which a trialkyl phosphate compound is used as a gelation inhibitor.

Since conventionally prepared trans polybutadiene has a large molecular weight and its molecular weight is not controllable, the Mooney viscosity of its compound is too high to be processed during rubber processing.

SUMMARY OF THE INVENTION

While searching for increasing productivity of trans polybutadiene and processability, the inventors of the present invention have found 1,4-trans polybutadiene with high yield using a catalyst system including a phosphorus-based compound as a novel ligand and capable of controlling the molecular weight of the 1,4-trans polybutadiene.

Thus, the present invention provides a 1,4-trans polybutadiene catalyst system to provide 1,4-trans polybutadiene with high trans content and its molecular weight controllable.

According to an aspect of the present invention, there is provided a catalyst for preparing 1,4-trans polybutadiene with high yield, the catalyst comprising a cobalt compound, an organoaluminum compound, a phenol-based compound, and a phosphorus-based compound and capable of controlling the molecular weight of 1,4-trans polybutadiene.

According to another aspect of the present invention, there is provided 1,4-trans polybutadiene prepared using the catalyst and a method of preparing 1,4-trans polybutadiene.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

DETAILED DESCRIPTION OF THE INVENTION

Hereinafter, the present invention will now be described more in detail with reference to the accompanying drawings, in which exemplary embodiments of the invention are shown.

The present invention provides a four-component catalyst comprising a cobalt compound, an organoaluminum compound, a phenol-based compound, and a phosphorus-based compound used to prepare 1,4-trans polybutadiene by polymerizing 1,3-butadiene or a butadiene derivative. The molecular weight of 1,4-trans polybutadiene may be controlled by regulating the amount of the phosphorus-based compound, and 1,4-trans polybutadiene is prepared with high yield using a small amount of the four-component catalyst.

The four-component catalyst comprises a cobalt compound, an organoaluminum compound, a phenol-based compound, and a phosphorus-based compound. Butadiene or a butadiene derivative is polymerized in the presence of the catalyst to prepare 1,4-trans polybutadiene with high yield.

The cobalt compound may be a cobalt salt of an organic acid or inorganic acid, preferably an organic acid salt which is highly soluble in an organic solvent, and more preferably a carboxylic acid salt. The carboxylic acid may have 8 to 20 carbon atoms with a saturated, unsaturated, circular or linear structure. Examples of the carboxylic acid are octoic acid, naphthenic acid, versatic acid, and stearic acid. Specifically, the cobalt carboxylic acid salt may be cobalt versatate, cobalt octoate, cobalt naphthenate, or the like.

In addition, the organoaluminum compound to which hetero type atoms coordinates may have a coordination number of 3 and comprise alkyl groups or halogen atoms. The organoaluminum compound may comprise 1 to 33 $C_1$-$C_8$ alkyl groups or halogen atoms. Examples of the organoaluminum compound are trimethylaluminum, triethylaluminum, tripropylaluminum, tributylaluminum, triisobutylaluminum, trihexylaluminum, diisobutylaluminum hydride, diisobutylaluminum chloride, diethylaluminum chloride, ethylaluminum sesquichloride, or the like. The amount of the organoaluminum compound may be in the range of 10 to 40 moles relative to 1 mole of the cobalt compound. If the amount of the organoaluminum compound is not within the range described above, it will reduce reactivity.

The phenol-based compound may be phenol or phenol substituted with a $C_1$-$C_{18}$ alkyl group, a $C_1$-$C_{18}$ alkoxy group, or a halogen atom. Examples of the phenol-based compound are ethylphenol, butylphenol, octylphenol, nonylphenol, dodecylphenol, hexyloxy phenol, pentylphenol, pentabutylphenol, pentaoctylphenol, pentadecylphenol, pentachlorophenol, pentabromophenol, or the like. The amount of the phenol-based compound may be in the range of 5 to 60 moles relative to 1 mole of the cobalt compound. If the amount of the phenol-based compound is not within the range described above, it will reduce reactivity.

The phosphorus-based compound may comprise at least one selected from the group consisting of an aliphatic phosphate compound represented by the Formula 1 below and an aliphatic phosphite compound represented by the Formula 2 below.

The phosphate compound may be hydrogen isopropyloctylphosphate, hydrogen butyloctylphosphate, hydrogen isopropylnonylphosphate, hydrogen isopropyldodecylphosphate, dibutyloctylphosphate, dibutylnonylphosphate, hydrogen dibutyldodecylphosphate, hydrogen diisopropylphosphate, hydrogen diisobutyl phosphate, hydrogen dihexylphosphate, hydrogen dioctylphosphate, hydrogen dinonylphosphate, hydrogen dicyclohexylphosphate, tributylphosphate, triisobutylphosphate, trihexylphosphate, trioctylphosphate, or the like.

The phosphite compound may be hydrogen diisopropylphosphite, hydrogen diisobutyl phosphite, hydrogen dihexylphosphite, hydrogen dioctylphosphite, hydrogen dinonylphosphite, hydrogen dicyclohexylphosphite, triisopropyl phosphite, diisopropyloctylphosphite, diisopropylnonylphosphite, diisopropyldodecylphosphite, dibutyloctylphosphite, dibutylcyclohexylphosphite, dibutylnonylphosphite, dibutyldodecylphosphite, tributylphosphite, triisobutylphosphite, trihexylphosphite, trioctylphosphite, or the like.

Formula 1

Formula 2

In Formulae 1 and 2, $R_1$, $R_2$, and $R_3$, being same or different with each other, respectively represent a $C_1$-$C_{20}$ aliphatic compound. Preferably, $R_1$, $R_2$, and $R_3$, being same or different with each other, respectively represent $C_1$-$C_{20}$ linear or branched alkyl group.

The phosphorus-based compound may comprise at least one selected from the group consisting of a cyclo diphosphate compound represented by the Formula 3 below and a cyclo diphosphonate compound represented by the Formula 4 below.

The cyclo diphosphate compound may be pentaerythritol diphenyl diphosphate, pentaerytol dicyclohexyl diphosphate, pentaerythritol diisopropyl diphosphate, pentaerythritol dibutyl diphosphate, pentaerythritol dipentyl diphosphate, pentaerythritol dihexyl diphosphate, pentaerythritol dioctyl diphosphate, or the like.

The cyclo diphosphonate compound may be pentaerytol bis(phenyl phosphonate), pentaerytol bis(cyclohexyl phosphonate), pentaerytol bis(isopropyl phosphonate), pentaerytol bis(butyl phosphonate), pentaerytol bis(hexyl phosphonate), pentaerytol bis(octyl phosphonate), or the like.

Formula 3

Formula 4

In Formulae 3 and 4, $R_4$ may be a $C_1$-$C_{20}$ aliphatic or aromatic compound. Preferably, $R_4$ may be a $C_1$-$C_{20}$ linear, branched, or cyclo alkyl group.

The phosphorus-based compound may be used in the range of 5 to 30 moles relative to 1 mole the cobalt compound. If the amount of the phosphorus-based compound is beyond the above range, it will reduce reactivity.

There is no limitation with regard to the solvent to be used for the manufacture of the trans polybutadiene but the conventional ones which are not reactive to a catalyst such as cyclohexane, hexane, heptane, toluene, and xylene used in the art may be used.

The amount of the catalyst may be in the range of $1 \times 10^{-5}$ to $1 \times 10^{-3}$ moles relative to 100 g of a monomer. If the amount of the catalyst is less than $1 \times 10^{-5}$ moles, reaction slowly occurs, and if the amount of the catalyst is greater than $1 \times 10^{-3}$ moles, reaction quickly occurs. Thus, the amount of the catalyst may be within the range described above, to control polymerization rate and properties of 1,4-trans polybutadiene.

The butadiene or the butadiene derivative to be used include 1,3-butadiene, isoprene, 1,3-pentadiene, 2,3-dimethyl-1,3-butadiene, myrcene, etc.

The polymerization solvent used in the polymerization of the 1,4-trans polybutadiene may be a nonpolar solvent selected from the group consisting of aliphatic hydrocarbon, cyclo aliphatic hydrocarbon, benzene, ethylbenzene, and xylene. Examples of the polymerization solvent are pentane, hexane, isopentane, heptane, octane, isooctane, cyclopentane, methylcyclopentane, cyclohexane, methylcyclohexane, ethylcyclohexane, benzene, toluene, ethylbenzene, and xylene. In this regard, oxygen and water may be removed from the polymerization solvent. The amount of the nonpolar solvent may be in the range of 3 to 10 times as much as that of the monomer. If the amount of the nonpolar solvent is less than 3 times, the polymerization solution may not be sufficiently transported. On the other hand, if the amount of the nonpolar solvent is greater than 10 times, it will reduce reactivity.

In particular, the polymerization may be performed in a high-purity nitrogen atmosphere at a temperature ranging from −20 to 100° C. for 30 minutes to 3 hours with a yield of 70% or greater. As a result of the polymerization, high 1,4-trans polybutadiene having a molecular weight ranging from 50,000 to 350,000 and a trans content in the range of 70 to 90% is prepared.

An antioxidant is added thereto, and a reaction terminating agent is added thereto to terminate the reaction. The antioxidant may be 2,6-di-t-butyl-p-cresol, a long-chain aliphatic amine compound, or the like. The reaction terminating agent may be methanol, ethanol, isopropanol, butanol, octanol, a long-chain aliphatic phosphate ester compound, or the like.

As described above, the molecular weight of 1,4-trans polybutadiene, which is prepared using a catalyst comprising a phosphorus-based compound as a novel ligand, may be controlled by the phosphorus-based compound. The yield of 1,4-trans polybutadiene is increased using a smaller amount of the catalyst comprising the phosphorus-based compound when compared with the yield of 1,4-trans polybutadiene prepared using a conventional catalyst system comprising a cobalt compound, an organoaluminum compound, and a phenol-based compound, or a catalyst system comprising a cobalt compound and an organoaluminum compound. Upon comparing structural characteristics of the ligand, 1,4-trans polybutadiene prepared using a phosphorus-based compound having residual hydrogen atoms has a higher yield and a lower molecular weight compared with 1,4-trans polybutadiene prepared using a phosphorus-based compound having all hydrogen atoms substituted with aliphatic substituents. The molecular weight of 1,4-trans polybutadiene prepared using a phosphate compound is lower than that of 1,4-trans polybutadiene prepared using a phosphite compound. In addition, the yield of 1,4-trans polybutadiene increases if a long-chain substituent is used. The yields and molecular weights of 1,4-trans polybutadiene are similar to each other when a diphosphate compound and a diphosphonate compound are used. The yield and molecular weight of 1,4-trans polybutadiene prepared using an aliphatic group is greater than those of 1,4-trans polybutadiene prepared using an aromatic group.

In addition, a rubber composition comprising 1,4-trans-polybutadiene according to the present invention has similar physical properties such as tensile strength and tear strength and lower Mooney viscosity, thereby excellent processability, when compared with a rubber composition comprising trans polybutadiene prepared by a conventional catalyst system which does not comprise a phosphorus-based compound.

Hereinafter, one or more embodiments will be described in detail with reference to the following examples. However, they should not be construed as limiting the scope of the present invention.

EXAMPLES

Example 1

A Ziegler-Natta catalyst system used in the polymerization included cobalt octoate (1.0% heptane solution), triisobutylaluminum (18% toluene solution), pentadecyl phenol (50% heptane solution), and hydrogen dibutylphosphate (50% toluene solution), and the amount of the cobalt catalyst was $1.65 \times 10^{-4}$ moles relative to 100 g of a monomer.

The polymerization was performed as follows. Nitrogen was sufficiently filled in a 2 L pressurized reactor. A dioctyl phosphorus-based compound, pentadecyl phenol, triisobutyl aluminum, and cobalt octoate were sequentially added to 1000 g of a heptane polymerization solvent such that the molar ratio of cobalt octoate:triisobutyl aluminum:pentadecyl phenol:hydrogen dibutyl phosphate was 1:25:45:5. 200 g of butadiene as a monomer was added thereto, and the mixture was subjected to a reaction at 85° C. for 2 hours. 2,6-di-t-butyl-p-cresol (5.0 g, 33% toluene solution) was used as an antioxidant, and ethanol (50 mL) was added thereto as a terminator to terminate the polymerization.

Figure 1:
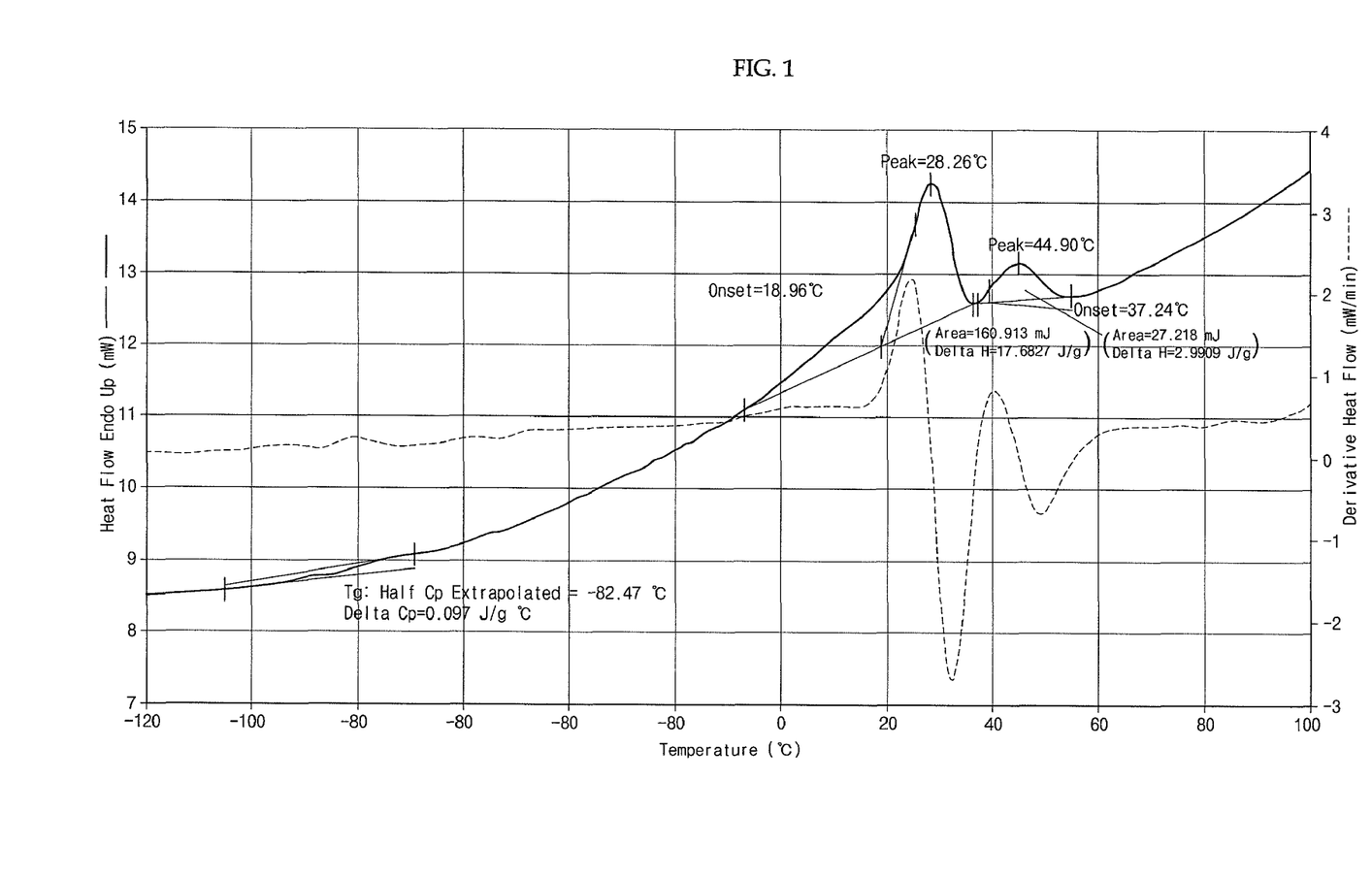
FIG. 1 is a graph illustrating results of thermal analysis of 1,4-trans polybutadiene in the presence of a four-component catalyst.

Then, thus obtained polymer solution was dried to measure the percentage of the polymer in the polymer solution, and then the yield of the polymer was obtained in consideration of the ratio of solvent:monomer. Then, the molecular weight of the polymer was analyzed using gel permeation chromatography. The measured yield of the polymer and the results of the molecular weight analysis were shown in Table 1 below, and results of a thermal analysis were shown in FIG. 1.

Example 2

Polymerization was performed in the same manner as in Example 1, except that the molar ratio of cobalt octoate:triisobutyl aluminum:pentadecyl phenol:hydrogen dibutylphosphate was 1:25:40:10. The yield of the polymer and the results of the molecular weight analysis performed by using gel permeation chromatography were shown in Table 1 below.

Example 3

Polymerization was performed in the same manner as in Example 2, except that the molar ratio of cobalt octoate:triisobutyl aluminum:pentadecyl phenol:hydrogen dibutylphosphate was 1:25:35:15.

Example 4

Polymerization was performed in the same manner as in Example 2, except that octylphenol was used as the phenol-based compound, hydrogen dioctylphosphate was used as the phosphorus-based compound, and the amount of the cobalt catalyst was $1.50 \times 10^{-4}$ moles relative to 100 g of the monomer.

Example 5

Polymerization was performed in the same manner as in Example 2, except that hydrogen butyloctylphosphate was used as the phosphorus-based compound, and the amount of the cobalt catalyst was $1.98 \times 10^{-4}$ moles relative to 100 g of the monomer.

Example 6

Polymerization was performed in the same manner as in Example 2, except that isopropyldibutylphosphate was used as the phosphorus-based compound, and the amount of the cobalt catalyst was $2.31 \times 10^{-4}$ moles relative to 100 g of the monomer.

Example 7

Polymerization was performed in the same manner as in Example 2, except that dibutyloctylphosphate was used as the phosphorus-based compound, and the amount of the cobalt catalyst was $1.98 \times 10^{-4}$ moles relative to 100 g of the monomer.

Example 8

Polymerization was performed in the same manner as in Example 2, except that tributylphosphate was used as the phosphorus-based compound, and the amount of the cobalt catalyst was $2.31 \times 10^{-4}$ moles relative to 100 g of the monomer.

Example 9

Polymerization was performed in the same manner as in Example 2, except that trioctylphosphate was used as the phosphorus-based compound.

Example 10

Polymerization was performed in the same manner as in Example 2, except that hydrogen dibutylphosphite was used as the phosphorus-based compound, and the amount of the cobalt catalyst was $2.31 \times 10^{-4}$ moles relative to 100 g of the monomer.

Example 11

Polymerization was performed in the same manner as in Example 2, except that octylphenol was used as the phenol-based compound and hydrogen dioctylphosphite was used as the phosphorus-based compound.

Example 12

Polymerization was performed in the same manner as in Example 2, except that tributylphosphite was used as the phosphorus-based compound, and the amount of the cobalt catalyst was $2.31 \times 10^{-4}$ moles relative to 100 g of the monomer.

Example 13

Polymerization was performed in the same manner as in Example 2, except that octylphenol was used as the phenol-based compound and trioctylphosphite was used as the phosphorus-based compound.

Example 14

Polymerization was performed in the same manner as in Example 2, except that triethyl aluminum was used as the organoaluminum compound, and pentaerythritol diphenyl diphosphate was used as the phosphorus-based compound. The amount of the cobalt catalyst was $1.98 \times 10^{-4}$ moles relative to 100 g of the monomer.

Example 15

Polymerization was performed in the same manner as in Example 2, except that triethyl aluminum was used as the organoaluminum compound, and pentaerythritol dicyclohexyl diphosphate was used as the phosphorus-based compound. The amount of the cobalt catalyst was $1.98 \times 10^{-4}$ moles relative to 100 g of the monomer.

Example 16

Polymerization was performed in the same manner as in Example 2, except that triethyl aluminum was used as the organoaluminum compound, and pentaerythritol bis(phenyl phosphonate) was used as the phosphorus-based compound. The amount of the cobalt catalyst was $1.98 \times 10^{-4}$ moles relative to 100 g of the monomer.

Example 17

Polymerization was performed in the same manner as in Example 2, except that triethyl aluminum was used as the organoaluminum compound, and pentaerythritol bis(cyclohexyl phosphonate) was used as the phosphorus-based compound. The amount of the cobalt catalyst was $1.98 \times 10^{-4}$ moles relative to 100 g of the monomer.

Comparative Example 1

The Ziegler-Natta catalyst system used in the polymerization was a three-component catalyst including cobalt octoate (1.0% heptane solution), triisobutylaluminum (18% toluene solution), and pentadecyl phenol (50% heptane solution), wherein the amount of the cobalt catalyst was $1.65 \times 10^{-4}$ moles relative to 100 g of the monomer. The polymerization was performed as follows. Nitrogen was sufficiently filled in a 2 L pressurized reactor. Pentadecyl phenol, tributyl aluminum, and cobalt octoate were added to 1000 g of a heptane polymerization solvent such that the molar ratio of cobalt octoate:triisobutyl aluminum:pentadecyl phenol was 1:20:40. 200 g of butadiene as a monomer was added thereto, and the mixture was subjected to a reaction at 70° C. for 2 hours.

2,6-di-t-butyl-p-cresol (5.0 g, 33% toluene solution) was used as an antioxidant, and ethanol (50 mL) was added thereto as a terminator to terminate the reaction.

Then, thus obtained polymer solution was dried to measure the percentage of the polymer in the polymer solution, and then the yield of the polymer was obtained in consideration of the ratio of solvent:monomer. Then, the molecular weight of the polymer was analyzed using gel permeation chromatography. The yield and the results of the molecular weight analysis were shown in Table 2 below.

Comparative Example 2

Polymerization was performed in the same manner as in Comparative Example 1, except that the amount of the cobalt catalyst was $3.3 \times 10^{-4}$ moles relative to 100 g of the monomer.

Comparative Example 3

Polymerization was performed in the same manner as in Comparative Example 1, except that the molar ratio of cobalt octoate:triisobutyl aluminum was 1:20.

Comparative Example 4

Polymerization was performed in the same manner as in Comparative Example 3, except that the amount of the cobalt catalyst was $3.3 \times 10^{-4}$ moles relative to 100 g of the monomer.

Table 1 shows physical properties of trans-1,4-polybutadiene prepared according to Examples 1 to 17. In addition, Table 2 shows physical properties of trans-1,4-polybutadiene prepared according to Comparative Example 1 to 4.

TABLE 1

| | Cobalt octoate (mole) | Organo-aluminum compound (mole) | Phenol-based compound (mole) | Phosphorus-based compound (mole) | Cobalt catalyst ($\times 10^{-4}$ mole/ 100 g butadiene) | Yield[1] (%) | Trans content (%) | Mw[2] | MWD[3] |
|---|---|---|---|---|---|---|---|---|---|
| Ex. 1 | 1 | TIBA 25 | PDP 45 | 5 | 1.65 | 95 | 84 | 275000 | 2.04 |
| Ex. 2 | 1 | TIBA 25 | PDP 40 | 10 | 1.65 | 91 | 82 | 188000 | 2.10 |
| Ex. 3 | 1 | TIBA 25 | PDP 35 | 15 | 1.65 | 85 | 81 | 228000 | 1.95 |
| Ex. 4 | 1 | TIBA 25 | OP 40 | 10 | 1.50 | 93 | 83 | 178000 | 2.23 |
| Ex. 5 | 1 | TIBA 25 | PDP 40 | 10 | 1.98 | 86 | 85 | 166000 | 2.10 |
| Ex. 6 | 1 | TIBA 25 | PDP 40 | 10 | 2.31 | 79 | 81 | 205000 | 2.07 |
| Ex. 7 | 1 | TIBA 25 | PDP 40 | 10 | 1.98 | 85 | 84 | 201000 | 2.15 |
| Ex. 8 | 1 | TIBA 25 | PDP 40 | 10 | 2.31 | 80 | 82 | 226000 | 2.12 |
| Ex. 9 | 1 | TIBA 25 | PDP 40 | 10 | 1.65 | 82 | 83 | 195000 | 2.00 |
| Ex. 10 | 1 | TIBA 25 | PDP 40 | 10 | 2.31 | 80 | 83 | 219000 | 2.31 |
| Ex. 11 | 1 | TIBA 25 | OP 40 | 10 | 1.65 | 88 | 85 | 191000 | 2.02 |
| Ex. 12 | 1 | TIBA 25 | PDP 40 | 10 | 2.31 | 76 | 80 | 219000 | 2.16 |
| Ex. 13 | 1 | TIBA 25 | OP 40 | 10 | 1.65 | 85 | 83 | 196000 | 1.97 |
| Ex. 14 | 1 | TEA 25 | PDP 40 | 10 | 1.98 | 80 | 81 | 215000 | 2.13 |
| Ex. 15 | 1 | TEA 25 | PDP 40 | 10 | 1.98 | 88 | 86 | 215000 | 2.08 |
| Ex. 16 | 1 | TEA 25 | PDP 40 | 10 | 1.98 | 78 | 82 | 213000 | 2.17 |
| Ex. 17 | 1 | TEA 25 | PDP 40 | 10 | 1.98 | 89 | 85 | 204000 | 2.00 |

TIBA: triisobutyl aluminum
TEA: triethyl aluminum
PDP: pentadecyl phenol
OP: octyl phenol
[1] yield: weight of dried polymer/weight of polymer solution × 100 × (solvent/monomer (w/w) + 1)
[2] Mw: weight average molecular weight
[3] MWD: molecular weight distribution

TABLE 2

| | Cobalt octoate (mole) | Organoaluminum compound (mole) | Phenol-based compound (mole) | Cobalt catalyst ($\times 10^{-4}$ mole/ 100 g butadiene) | Yield[1] (%) | Trans content (%) | Mw[2] | MWD[3] |
|---|---|---|---|---|---|---|---|---|
| Comp. Ex. 1 | 1 | TIBA 20 | PDP 40 | 1.65 | 63 | 80 | 395000 | 2.21 |
| Comp. Ex. 2 | 1 | TIBA 20 | PDP 40 | 3.30 | 74 | 83 | 360000 | 2.09 |
| Comp. Ex. 3 | 1 | TIBA 20 | PDP 0 | 1.65 | 55 | 77 | 401000 | 2.33 |

TABLE 2-continued

| | Cobalt octoate (mole) | Organoaluminum compound (mole) | Phenol-based compound (mole) | Cobalt catalyst (×10⁻⁴ mole/ 100 g butadiene) | Yield[1] (%) | Trans content (%) | Mw[2] | MWD[3] |
|---|---|---|---|---|---|---|---|---|
| Comp. Ex. 4 | 1 | TIBA 20 | PDP 0 | 3.30 | 65 | 75 | 359000 | 2.16 |

Figure 2:
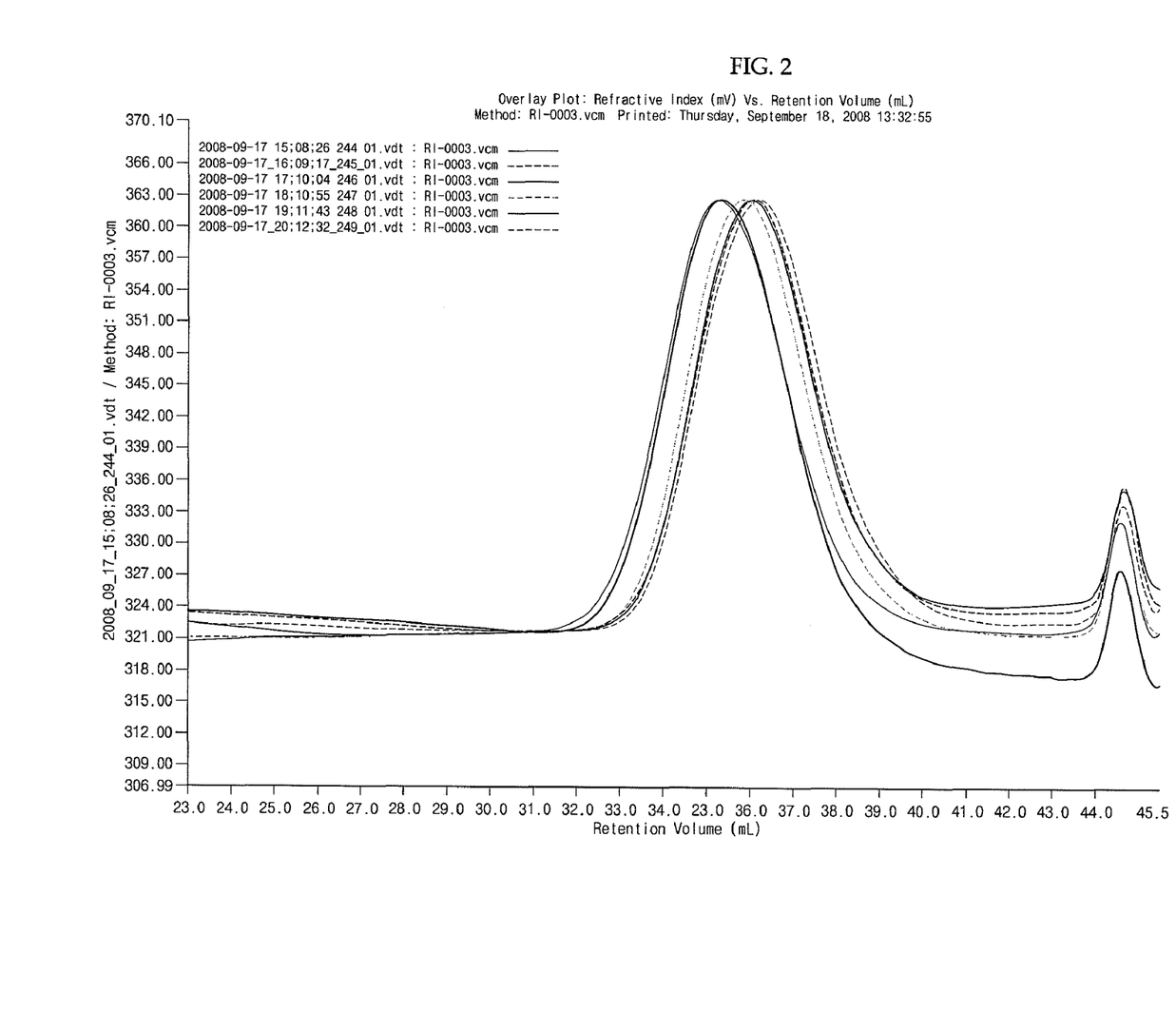
FIG. 2 is a graph illustrating results of gel permeation chromatography of 1,4-trans polybutadiene prepared in the presence of a four-component catalyst.

TIBA: triisobutyl aluminum
PDP: pentadecyl phenol
[1] yield: weight of dried polymer/weight of polymer solution × 100 × (solvent/monomer (w/w) + 1)
[2] Mw: weight average molecular weight
[3] MWD: molecular weight distribution Referring to FIG. 2, a black line indicates the result of the molecular weight analysis of trans-1,4-polybutadiene prepared according to Comparative Example 3, and a red line indicates the result of the molecular weight analysis of trans-1,4-polybutadiene prepared according to Comparative Example 1. In addition, a blue line indicates the result of the molecular weight analysis of trans-1,4-polybutadiene prepared according to Example 1, a soft red line indicates the result of the molecular weight analysis of trans-1,4-polybutadiene prepared according to Example 2, a mustard color line indicates the result of the molecular weight analysis of trans-1,4-polybutadiene prepared according to Example 3, and a yellowish green line indicates the result of the molecular weight analysis of trans-1,4-polybutadiene prepared according to Example 4. The molecular weight of trans-1,4-polybutadiene prepared according to Comparative Examples 1 and 2 which does not comprise the phosphorus-based compound was larger than that of trans-1,4-polybutadiene prepared according to Examples 1 to 3 which comprises the phosphorus-based compound. When using the catalyst system including the phosphorus-based compound, the molecular weight of trans-1,4-polybutadiene decreases as the amount of the phosphorus-based compound increases. Trans-1,4-polybutadiene prepared according to Example 2 (20%, soft red) had the lowest molecular weight.

Examples 18 to 20 and Comparative Examples 5 to 9

Measurement of Physical Properties of Rubber Compounds

Emulsion styrene-butadiene rubber, 1,4-cis polybutadiene, natural rubber, and 1,4-trans polybutadiene (t-BR) prepared according to Example 2 and Comparative Example 1 were mixed according to the composition shown in Table 3 below at 120° C. using a 500 cc Brabender, and the mixture was blended at 80° C. using a roll mill. Then, the mixture was subjected to vulcanization at 160° C. using a press for a time period measured by RPA (Rubber Processing Analyzer, RPA 2000, Alpha Technologies).

The measured physical properties are shown in Table 3 below. SBR-1712 manufactured by Kumho Petrochemical Co., Ltd. was used as the emulsion styrene-butadiene rubber (ESBR), KBR-01 manufactured by Kumho Petrochemical Co., Ltd. was used as 1,4-cis polybutadiene (BR), and RSS No. 1 was used as the natural rubber (NR).

Method of Measurement
1. Hardness: Measured According to ASTM D 2240

Hardness is a degree of resistance to penetration of needle having the surface with a standard size under a standard weight. Shore A hardness is applied to rubber. A harder material has a higher hardness value. However, if the hardness is too high, rubber loses its intrinsic properties. An appropriate shore A hardness is equal to or less than 80.

2. Modulus: Measured According to ASTM D 412

Modulus is defined as a force required for maintaining a specific elongation rate and measured by tensile test pulling a sample at a constant speed. The unit of modulus is $kg_f/cm^2$ or MPa which is the same as that of tensile strength. A modulus of a rubber combination is measured at an elongation rate of 100%, 200%, and 300%. A modulus of a vulcanized rubber is determined by hardness of the vulcanized rubber composition and the degree of vulcanization. As the hardness and degree of vulcanization increases, a modulus increases. Even though a high modulus exhibits excellent properties of the rubber composition, a too high modulus decreases fraction elongation, and thus the modulus and fraction elongation are required to be balanced.

3. Tensile Strength: Measured According to ASTM D 412

Tensile strength is a force or stress generated when a test sample is cut off by pulling the sample at a constant tension, and the unit of the tensile strength is $kg_f/cm^2$ or MPa. The tensile strength indicates a mechanical strength of a vulcanized rubber composition. A high tensile strength value indicates high tensile strength, thereby exhibiting excellent properties of rubber compositions.

4. Elongation at Break: Measured According to ASTM D 412

Elongation at break indicates a deformation rate when a test sample is cut off while pulling the test sample at a constant tension. A high value of elongation at break indicates high elongation property of vulcanized rubber, thereby exhibiting excellent properties of rubber compositions.

5. Tear Strength: Measured According to ASTM D 624

Tear strength is defined as the maximum force per unit thickness required to cause a rupture of a test sample, and the unit of the tear strength is N/mm or $kg_f/mm$. A high tear strength value indicates that a material is highly resistant to tearing caused by a groove or a point at which stress is concentrated, thereby exhibiting excellent properties of rubber compositions.

6. DIN Type Abrasion: Measured According to ASTM D 5963

DIN type abrasion is measured by wearing a vulcanized rubber sample using a drum to which a standard polishing pad is attached, at a speed of 40 rpm/min and comparing the weight loss of samples. A low DIN type abrasion value indicates a small weight loss of the sample, thereby exhibiting excellent properties of rubber compositions.

7. Cut & Chip

Cut & chip is one of the abrasion tests. A vulcanized rubber sample is mounted on a rotary roll, and 750 cycles of rotation are performed for 10 minutes while applying the blade of a knife to the vulcanized rubber sample. Then, the weight of the vulcanized rubber sample is reduced, and the weight loss of the vulcanized rubber sample is the cut & chip. A low chip & cut value indicates a small weight loss of the sample as in the DIN type abrasion, thereby exhibiting excellent properties of rubber compositions.

8. Compound Mooney Viscosity 30 g of a vulcanized rubber sample is rolled to prepare two pieces having a thickness of 0.8 cm and an area of 5 cm×5 cm. The sample was attached to front and rear surfaces of a rotary rotor and pre-heated to 100° C. for 1 minute. The change of viscosity was measured for 4 minutes after the operation of the rotor is initiated using a rotary viscometer to obtain Mooney viscosity represented by $ML_{1+4}$ 100° C. A high Mooney viscosity value indicates a high viscosity of the rubber compound, thereby decreasing processability. Thus, a low Mooney viscosity of a compound may exhibit easy process in rubber compounding.

TABLE 3

| | | Comp. Ex. 5 | Ex. 18 | Ex. 19 |
|---|---|---|---|---|
| Type of rubber | | ESBR/BR/NR | ESBR/BR/NR/t-BR (Example 1) | ESBR/BR/NR/t-BR (Example 2) |
| Composition (ESBR/BR/NR/t-BR) | | 40/20/40/0 | 40/20/10/30 | 40/20/10/30 |
| Compound Mooney viscosity | | 53.5 | 60.4 | 58.7 |
| Properties of vulcanized rubber | Hardness (shore A) | 60.2 | 60.5 | 62.1 |
| | 100% modulus (kgf/cm$^2$) | 17.3 | 15.9 | 15.8 |
| | 300% modulus (kgf/cm$^2$) | 78.2 | 71.9 | 71.5 |
| | Tensile strength (kgf/cm$^2$) | 178.2 | 189.2 | 188.8 |
| | elongation at break (%) | 594.5 | 619.2 | 621.4 |
| | Tear strength (kgf/mm) | 4.8 | 5.0 | 4.9 |
| | DIN abrasion (mg) | 789 | 465 | 515 |
| | Cut & Chip (mg) | 3047 | 2295 | 2385 |
| | | Ex. 20 | Comp. Ex. 6 | Comp. Ex. 7 |
| Type of rubber | | ESBR/BR/NR/t-BR (Ex. 3) | ESBR/BR/NR/t-BR (Comp. Ex. 1) | ESBR/BR/NR/t-BR (Comp. Ex. 2) |
| Composition (ESBR/BR/NR/t-BR) | | 40/20/10/30 | 40/20/10/30 | 40/20/10/30 |
| Compound Mooney viscosity | | 54.3 | 84.1 | 82.4 |
| Properties of vulcanized rubber | Hardness (shore A) | 60.0 | 70.0 | 68.6 |
| | 100% modulus (kgf/cm$^2$) | 15.7 | 22.5 | 20.8 |
| | 300% modulus (kgf/cm$^2$) | 71.2 | 79.1 | 76.2 |
| | Tensile strength (kgf/cm$^2$) | 188.2 | 182.3 | 176.2 |
| | elongation at break (%) | 618.7 | 500.2 | 589.2 |
| | Tear strength (kgf/mm) | 4.8 | 5.1 | 5.1 |
| | DIN abrasion (mg) | 485 | 450 | 523 |
| | Cut & Chip (mg) | 2301 | 2191 | 2295 |
| | | Comp. Ex. 8 | Comp. Ex. 9 | |
| Type of rubber | | ESBR/BR/NR/t-BR (Comp. Ex. 3) | ESBR/BR/NR/t-BR (Comp. Ex. 4) | |
| Composition (ESBR/BR/NR/t-BR) | | 40/20/10/30 | 40/20/10/30 | |
| Compound Mooney viscosity | | 79.0 | 78.3 | |
| Properties of vulcanized rubber | Hardness (shore A) | 69.2 | 65.3 | |
| | 100% modulus (kgf/cm$^2$) | 21.3 | 18.5 | |
| | 300% modulus (kgf/cm$^2$) | 77.5 | 74.2 | |
| | Tensile strength (kgf/cm$^2$) | 180.3 | 184.3 | |
| | elongation at break (%) | 526.5 | 592.1 | |
| | Tear strength (kgf/mm) | 5.1 | 5.0 | |
| | DIN abrasion (mg) | 450 | 537 | |
| | Cut & Chip (mg) | 2098 | 2205 | |

1,4-trans Polybutadiene can be prepared with high yield using a small amount of the catalyst including a phosphorus-based compound as a novel ligand, and the catalyst can easily control the molecular weight of 1,4-trans polybutadiene.

In addition, a rubber composition comprising 1,4-trans polybutadiene prepared using the catalyst according to the present invention has better processability than that including 1,4-trans polybutadiene prepared using a conventional catalyst system which does not include a phosphorus-based compound.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A catalyst for preparing 1,4-trans polybutadiene comprising a cobalt compound, an organoaluminum compound, a phenol-based compound, and a phosphorus-based compound, and capable of controlling the molecular weight of 1,4-trans polybutadiene.

2. The catalyst of claim 1, wherein the cobalt compound is a cobalt salt of an organic acid or inorganic acid.

3. The catalyst of claim 1, wherein the organoaluminum compound comprises 1 to 33 $C_1$-$C_8$ alkyl groups or halogen atoms.

4. The catalyst of claim 1, wherein the phenol-based compound is phenol or phenol substituted with a $C_1$-$C_{18}$ alkyl group, a $C_1$-$C_{18}$ alkoxy group, or a halogen atom.

5. The catalyst of claim 1, wherein the phosphorus-based compound comprises at least one compound selected from the group consisting of compounds represented by the Formulae 1 to 4 below;

(1)

(2)

wherein $R_1$, $R_2$, and $R_3$ of Formulae 1 and 2, being same or different with each other, respectively represent a $C_1$-$C_{20}$ aliphatic compound, (3)

(4)

wherein $R_4$ of Formulae 3 and 4 is a $C_1$-$C_{20}$ aliphatic or aromatic compound.

6. The catalyst of claim 1, wherein the amount of the organoaluminum compound is in the range of 10 to 40 moles relative to 1 mole of the cobalt compound.

7. The catalyst of claim 1, wherein the amount of the phenol-based compound is in the range of 5 to 60 moles relative to 1 mole of the cobalt compound.

8. The catalyst of claim 1, wherein the amount of the phosphorus-based compound is in the range of 5 to 30 moles relative to 1 mole of the cobalt compound.

9. A method of preparing 1,4-trans polybutadiene by polymerizing a butadiene monomer at a temperature ranging from 60 to 100° C. in the presence of a catalyst of claim 1.

10. The method of claim 9, wherein the amount of the catalyst is in the range of $1\times10^{-5}$ to $1\times10^{-3}$ moles relative to 100 g of the monomer.

11. The method of claim 9, wherein the 1,4-trans polybutadiene has a trans content in the range of 70 to 90%.

12. The catalyst of claim 5, wherein:
the cobalt salt is a cobalt carboxylic acid salt, wherein the carboxylic acid has 8 to 20 carbon atoms with a saturated, unsaturated, cyclic or linear structure;
the organoaluminum compound comprises 1 to 33 $C_1$-$C_8$ alkyl groups or halogen atoms; and
the phenol-based compound is phenol or phenol substituted with a $C_1$-$C_{18}$ alkyl group, a $C_1$-$C_{18}$ alkoxy group, or a halogen atom.

13. The catalyst of claim 12, wherein:
the amount of the organoaluminum compound is in the range of 10 to 40 moles relative to 1 mole of the cobalt compound;
the amount of the phenol-based compound is in the range of 5 to 60 moles relative to 1 mole of the cobalt compound; and
the amount of the phosphorus-based compound is in the range of 5 to 30 moles relative to 1 mole of the cobalt compound.

14. The catalyst of claim 13, wherein:
the cobalt salt is selected from the group consisting of cobalt versatate, cobalt octoate, and cobalt naphthenate;
the organoaluminum compound is selected from the group consisting of trimethylaluminum, triethylaluminum, tripropylaluminum, tributylaluminum, triisobutylaluminum, trihexylaluminum, diisobutylaluminum hydride, diisobutylaluminum chloride, diethylaluminum chloride, and ethylaluminum sesquichloride;
the phenol-based compound is selected from the group consisting of ethylphenol, butylphenol, octylphenol, nonylphenol, dodecylphenol, hexyloxy phenol, pentylphenol, pentabutylphenol, pentaoctylphenol, pentadecylphenol, pentachlorophenol, and pentabromophenol; and
the phosphorus based compound is (1) a phosphate compound selected from the group consisting of hydrogen isopropyloctylphosphate, hydrogen butyloctylphosphate, hydrogen isopropylnonylphosphate, hydrogen isopropyldodecylphosphate, dibutyloctylphosphate, dibutylnonylphosphate, hydrogen dibutyldodecylphosphate, hydrogen diisopropylphosphate, hydrogen diisobutyl phosphate, hydrogen dihexylphosphate, hydrogen dioctylphosphate, hydrogen dinonylphosphate, hydrogen dicyclohexylphosphate, tributylphosphate, triisobutylphosphate, trihexylphosphate, and trioctylphosphate; or (2) a phosphite compound selected from the group consisting of hydrogen diisopropylphosphite, hydrogen diisobutyl phosphite, hydrogen dihexylphosphite, hydrogen dioctylphosphite, hydrogen dinonylphosphite, hydrogen dicyclohexylphosphite, triisopropyl phosphite, diisopropyloctylphosphite, diisopropylnonylphosphite, diisopropyldodecylphosphite, dibutyloctylphosphite, dibutylcyclohexylphosphite, dibutylnonylphosphite, dibutyldodecylphosphite, tributylphosphite, triisobutylphosphite, trihexylphosphite, and trioctylphosphite.

15. A method of preparing 1,4-trans polybutadiene by polymerizing a butadiene monomer at a temperature ranging from 60 to 100° C. in the presence of a catalyst of claim 14.

16. The method of claim 15, wherein the amount of the catalyst is in the range of $1\times10^{-5}$ to $1\times10^{-3}$ moles relative to 100 g of the monomer.

17. The method of claim 16, wherein the 1,4-trans polybutadiene has a trans content in the range of 70 to 90%.

* * * * *